March 14, 1967     E. G. KEETON     3,308,774
SEED PLANTER
Original Filed Jan. 20, 1964     3 Sheets-Sheet 2
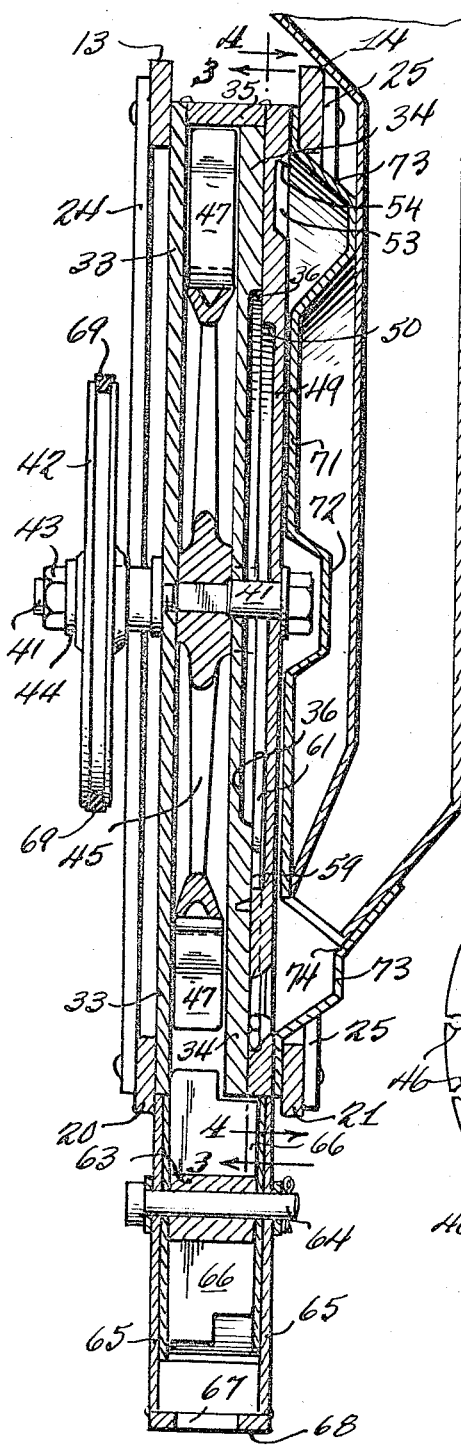
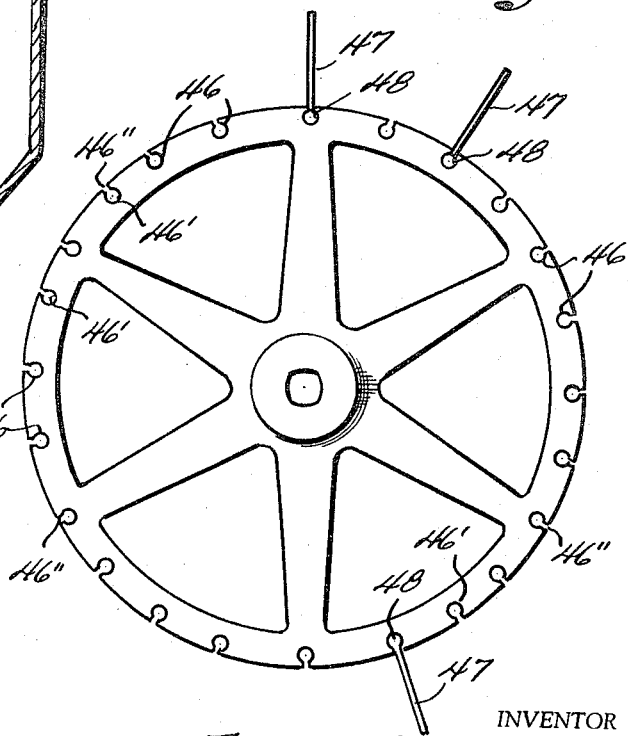
INVENTOR
EUGENE G. KEETON
BY
Cushman, Darby & Cushman
ATTORNEYS

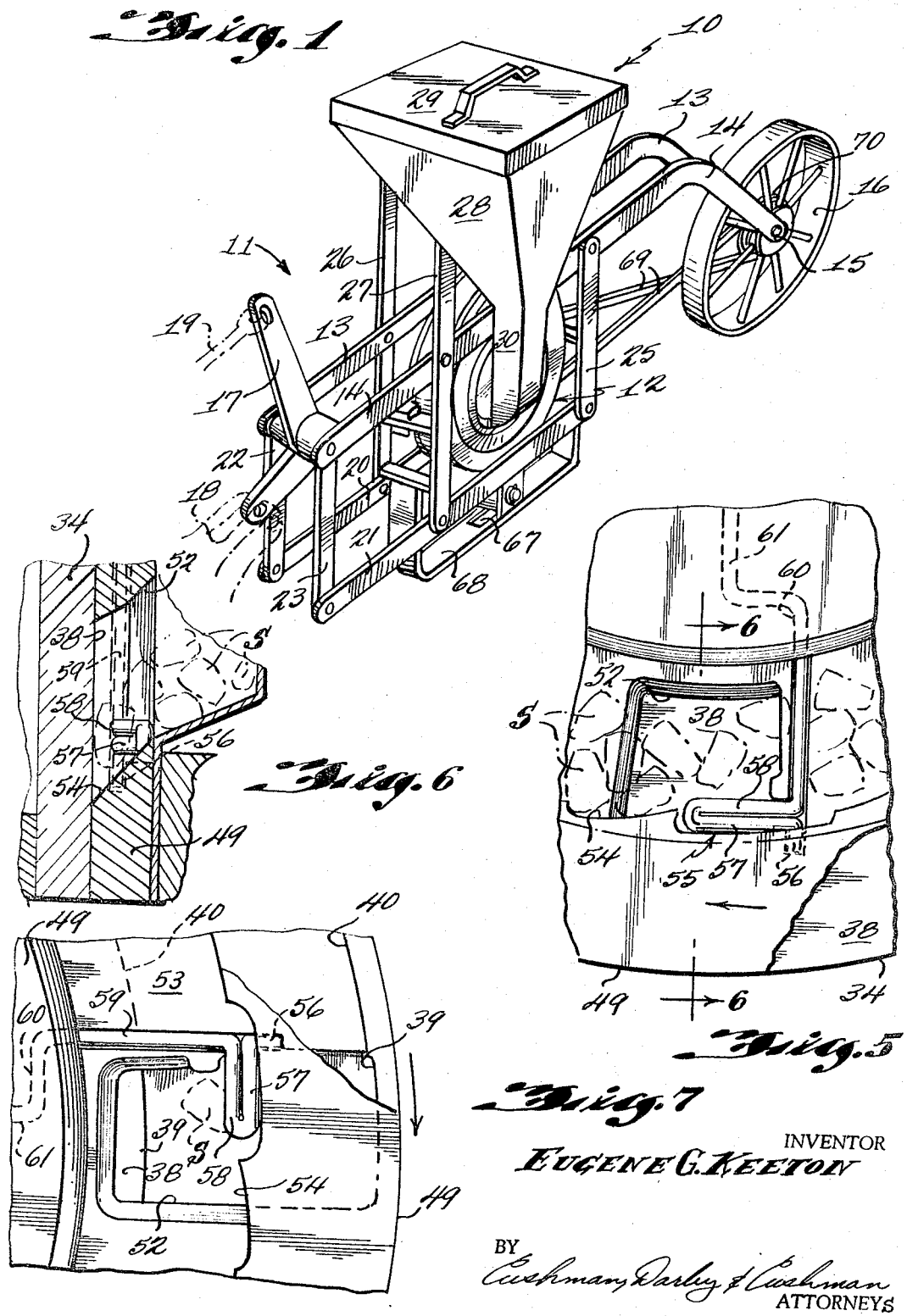

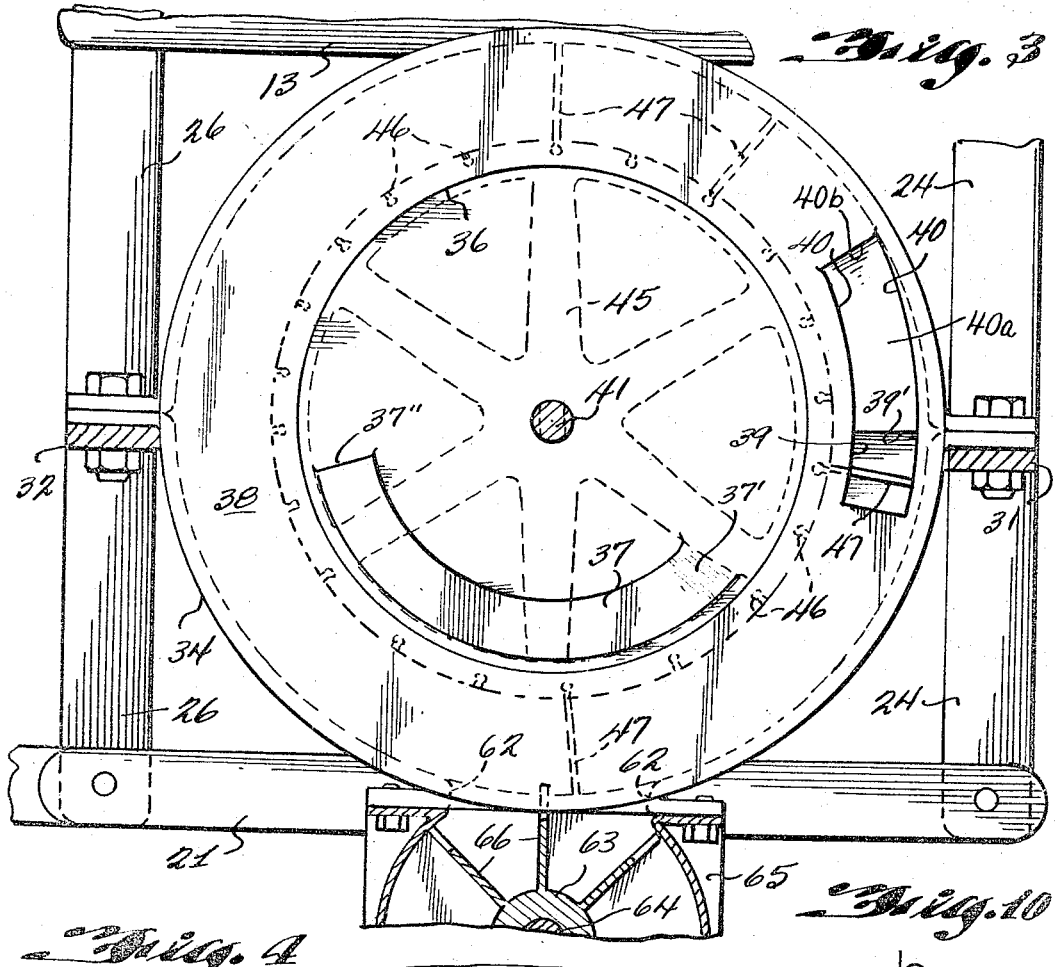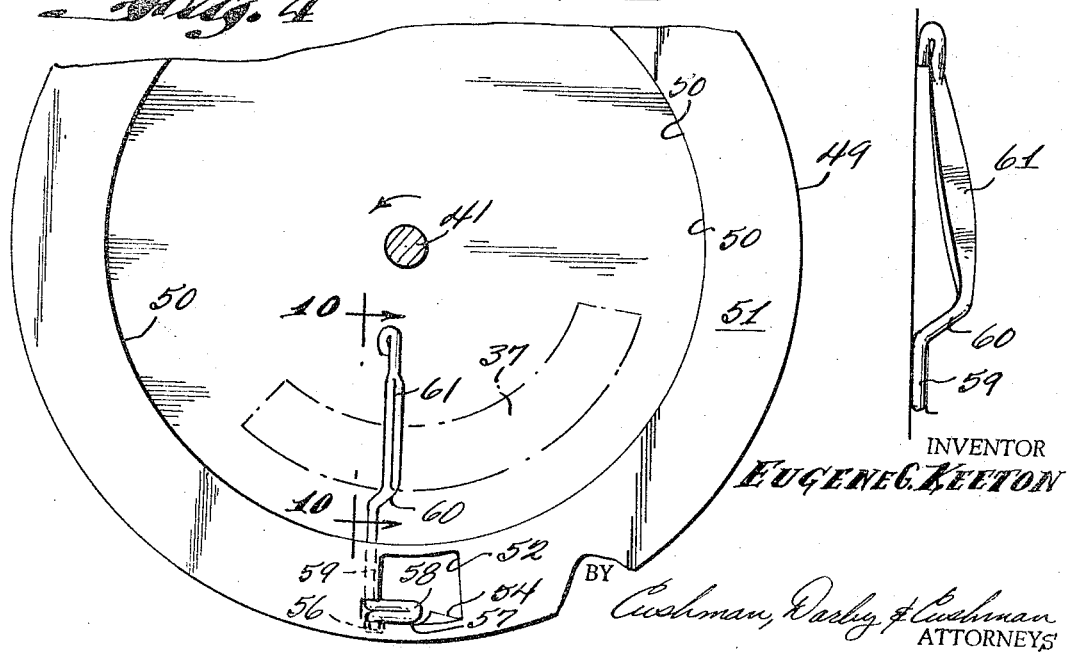

United States Patent Office 3,308,774
Patented Mar. 14, 1967

3,308,774
SEED PLANTER
Eugene G. Keeton, Trenton, Ky., assignor to Deere & Company, Moline, Ill., a corporation of Delaware
Continuation of application Ser. No. 338,927, Jan. 20, 1964. This application May 16, 1966, Ser. No. 550,569
25 Claims. (Cl. 111—77)

This application is a continuation of my parent application Ser. No. 338,927, filed Jan. 20, 1964, and now abandoned.

This invention relates to a new and improved seed planter of the type intended to be attached to the usual tractor or other draft vehicle and which will deposit seeds into a furrow formed in the ground.

The preparation of a field for planting requires a large amount of hard work and expense, the latter being incurred by the cost of fertilizer, seed, equipment and expenditure of time. Therefore, it is necessary that the actual planting of the seed be carried out such that the farmer can rest assured that he has an even planting. If the seed planter should skip and leave areas not planted, then a great deal of work and money have been wasted and unfortunately this is not known until the plants break ground, at which time it may be too late to replant. On the other hand, should the seed planter drop too many seeds, a large amount of additional work and expense is involved to thin out the plants to the desired number.

Seed planters of many various types and designs are now presently on the market but none of the known machines can perform to deposit a given number of seeds in hills or spacings along a furrow without some skipping or depositing extra seeds. Therefore, it is a principal object of the present invention to provide a seed planter which will overcome the weaknesses of the present planters.

Another object of the present invention is to provide a seed planter which will deposit a given number of seeds into the ground at a given distance apart and wherein the number of seeds deposited can be controlled at the will of the operator.

Still another object of the invention is to provide a seed planter which will eliminate skipping during the deposition of the seeds so that the farmer or operator of the planter does not have to worry as to whether or not the area which he has covered is correctly planted.

Still another object of the invention is to provide a seed planter comprising a hopper and rotating disc type seed distributor which comprises a single compact unit.

A further object of the invention is to provide a seed planter of few moving parts so there is very little possibility of mechanical failures.

A further object of the invention is to provide a seed planter which may be used to plant seeds of various sizes without the necessity of a large amount of auxiliary equipment.

Still a further object of the invention is to provide a seed planter wherein the rotary disc type distributor section is easily removable from the frame so the discs can be changed if necessary.

These and other objects of the present invention are set forth in greater detail in the following description having reference to the attached drawings wherein an illustrative embodiment of the invention is shown.

FIGURE 1 is a perspective view of the seed planter of this invention;

FIGURE 2 is a side elevation section view through the seed planting mechanism only of the planter shown in FIGURE 1;

FIGURE 3 is a view along line 3—3 of FIGURE 2;

FIGURE 4 is a view along line 4—4 of FIGURE 2;

FIGURE 5 is a fragmentary view partially broken away of a seed pocket and a gripping finger;

FIGURE 6 is a view taken along line 5—5 in FIGURE 5;

FIGURE 7 is a fragmentary view partially broken away showing a seed pocket in position over the discharge opening;

FIGURE 8 is a view of the compartmented wheel;

FIGURE 9 is a view of one of the dividers for the wheel shown in FIGURE 8; and

FIGURE 10 is a fragmentary view of the inner portion of one of the movable fingers.

In the following description right-hand and left-hand reference is determined by standing to the rear of the planter and facing the direction of travel.

Now, having more particular reference to the drawings, an illustrative embodiment of the new and improved seed planter of the invention is generally indicated at 10 and includes a frame 11 and a seed distributor 12.

As best shown in FIGURE 1, the frame 11 includes upper structural members 13 and 14 which extend rearwardly then downwardly in parallel relationship. A ground engaging wheel 16 is rotatably mounted between the ends of the downward extending portion of the members 13 and 14 on an axle 15 supported by these members.

Mounted between the forward ends of members 13 and 14 there is the usual hitching member 17 for connecting the planter 10 to a suitable tractor or draft vehicle. Other connections to the tractor are indicated at 18 and 19 but as these connections form no part of the present invention, no further description is believed necessary. Located directly below the members 13 and 14 are lower parallel frame members 20 and 21. Member 20 lies in the same vertical plane and extends in the same direction as does member 13 and member 21 lies in the same vertical plane and extends in the same direction as member 14.

Both members 20 and 21 are somewhat shorter in length than members 13 and 14 and the front ends of members 20 and 21 are connected respectively to members 13 and 14 by vertical frame elements 22 and 23. The rear ends of members 20 and 21 are connected to members 13 and 14 in a like manner by vertical frame elements 24 (FIG. 3) and 25.

Located between elements 22 and 24 is a hopper support member 26 which is securely fastened to the upper and lower frame members 13 and 20. In a like manner, a second hopper support member 27 is located opposite support 26 and is fastened to upper and lower members 14 and 21. Both support members extend upwardly a short distance above the members 13 and 14. When the frame parts 13 through 27 are assembled and secured together, a generally rectangular box-like frame results having the ground wheel 16 at the rear thereof, the tractor hitch at the forward end and the support members 26 and 27 extending above members 13 and 14 respectively.

A hopper 28 having a top 29 is mounted on the frame by being secured to the upper ends of supports 26 and 27 and may also be fastened to member 14 if desired.

A seed boot 30 is formed integrally with the hopper 28 and extends downwardly to connect with the seed distributor generally shown at 12 which is supported inside the frame 11. The distributor 12 which is mounted for easy removal may be detachably secured to cross braces 31 and 32 (FIG. 3) which are fastened by suitable means to elements 24–25 and 26–27 respectively. The seed distributor 12 is in the form of a generally circular housing including a right plate 33 and a left plate 34 spaced from the right plate and held in this position by a spacer strip 35 which extends circumferentially around the major portion of the plates 33 and 34 and which is secured thereto as by welding.

The left plate 34 is provided with a circular recess 36 having located therein and secured to the bottom wall thereof near its outer edge an arcuate cam 37.

Arranged adjacent the bottom of the recess 36 when the seed distributor 12 is mounted in vertical position within the frame 11, cam 37 has a surface which gradually increases in height with respect to the bottom wall of recess 36 from its beginning at 37' to its point of termination 37". At the point 37", the cam ends and sharply drops off to the surface of recess 36.

The plate 34 is further provided with a first flat outer engaging surface 38 lying between and defined by the outer circumference of recess 36 and the outer circumference of plate 34. Within this flat outer portion 38 there is a discharge opening 39 communicating with the space between plates 33 and 34. Opening 39 is located at the rear of the plate 34 and approximately on the horizontal centerline thereof when the seed distributor 12 is mounted as shown in FIGURES 1 and 3 within the frame.

The surface 38 has an arcuately shaped depression or recessed area 40 having a second engaging surface 40a which extends in a counter clockwise direction away from the leading edge 39' of discharge opening 39 as viewed from the left side as in FIG. 3. The width of the recess 40 approximates that of opening 39 and length is approximately twice the length of opening 39 although it could be somewhat longer or shorter without interfering with its purpose which will be set forth hereinafter. The depression 40 is formed with a front edge or step 40b.

The plates 33 and 34 are each provided with a central bore to rotatably receive a shaft 41 which extends rearwardly of plate 33 a sufficient distance to have secured thereto for rotation therewith a pulley wheel 42 which is held to the threaded end of shaft 41 by a nut 43 and washer 44 or similar type of fastener.

A compartmented wheel 45 is mounted on shaft 41 in the space between plates 33 and 34 and is secured to the shaft 41 so that it will rotate therewith. The outer periphery of the wheel 45 is provided with a plurality of openings 46 to receive divider elements 47. The openings 46 are in the form of a circular opening 46' having a narrow necked portion 46" connecting the opening 46' with the periphery of the wheel 45. The dividers 47 are in the form of a rectangular plate having a width substantially the same as the width of the space between plates 33 and 34 and also having a circular protuberance 48 at one end thereof. It will be seen that plates 47 may be easily positioned at desired intervals relative to the wheel 45 by merely sliding the protuberance 48 into a selected one of the openings 46' while the necked portion 46" receives the thickness of the plate. By positioning the plates 47 in different openings 46, various size compartments can be obtained for reasons which will be discussed hereinafter.

A disc 49 is rotatably mounted on the outer face of plate 34 and contains a central opening which receives one end of shaft 41. The disc 49 is secured to the shaft 41 so it will rotate with the compartmented wheel 45 and the pulley wheel 42 when the latter is caused to be rotated. A recess 50 is provided in the interface of disc 49 and corresponds in dimension to approximately that of the recess 36 of plate 34. The disc 49 has an outer portion 51 located between the outer edge of recess 50 and the outer edge of disc 49, the portion 51 having opposed right and left surfaces, the right surface cooperating with the flat portion 38 of plate 34. Spaced at suitable intervals around the outer portion 51 is a plurality of openings 52, only one of which is shown in the drawings, it being understood that the number of openings can be controlled and will be determined by the results desired as will be explained in the operation of the device. The disc 49 is intended to be rotated in a counter-clockwise direction when viewed from the right of the planter. The left surface of the outer portion 51 provided with an annular recess 53 which is of a width approximately that of the opening 52.

As best seen in FIGURE 6, the radially outer edge of the recess 53 is bevelled inwardly toward the bottom wall thereof as shown at 54. The bevelled portion 54 extends from a point a short distance in front of each of the leading edges of the openings 52 when the disc is rotated clockwise to a point approximately half the length of the opening. Because the bevelled portion 54 extends for a short distance in front of the leading edge of the opening 52, it acts to correctly position seeds S in the opening 52.

Mounted at its rearmost edge of opening 52 and extending into said opening is a finger generally shown at 55 made of a single piece of round metal stock. The forward end or the gripping or engaging portion of the finger 55 includes a straight short section 56 mounted within a bearing opening provided in the disc 49 at the outer edge of each of the openings 52. The finger then is bent at right angles to form a leg 57 extending inwardly of the opening 52 and a reverse bend forms a second leg 58 extending to the rear of opening 52 until it reaches a point in alignment with the portion 56. At this point, the finger is again bent at right angles in a direction away from the portion 56 to form a straight portion 59 coaxial with the portion 56. The straight portion 59 extends inwardly beyond the inner edge of outer portion 51 of the disc 49 and into the recess 50 on the innerface of disc 49. At this point, the finger is bent at right angles to form a leg 60 extending inwardly with respect to opening 52 and then is once more bent at right angles to form still another leg 61 extending radially inwardly of recess 50. The leg portions 60 and 61 comprise an inner portion of the finger and are bent such that they are angularly displaced out of the plane of the gripping portion comprising legs 56, 57, 58 and 59 such that the inner portion acts as a spring to bias the gripping portion toward the flat outer surface 38 of plate 34 when the seed distributor 12 is in assembled condition.

To obtain maximum spring action, the innermost free end of leg 61 and the junction of legs 59 and 60 should lie approximately in the plane of the gripping portion of finger 55 and the amount of angular displacement of the legs 61 and 60 should increase from these points to a maximum at the point where the two legs join each other.

During the rotation of the disc 49 in a clockwise direction as shown by the arrows in FIGURES 5 and 7, the inner leg portion 61 of the finger 55 cooperates with cam 37 and causes the outer gripping portion of the finger to be raised away from the flat portion 38 of plate 34 to receive therebetween the seed S. The underside of legs 57 and 58 of the gripping portion may be roughened by any suitable means to aid the gripping action.

The spacer strip 35 which separates the plates 33 and 34 encloses the entire circumference of the plates except for a portion at the bottom thereof when the seed distributor 12 is mounted within the frame 11. The portion which is not enclosed forms an opening 62 through which seed delivered by opening 39 to the interior of the distributor 12 may be dispensed to the ground. A second compartmented wheel 63 is secured to a shaft 64 rotatably supported in a pair of plates 65 such that the upper edge of the dividers 66 of the wheel 63 will pass into the opening 62 and extend thereabove. The wheel 63 acts as a valve gate to receive seeds from the first compartmented wheel 45 and delivers them to the ground through an opening 67 provided within a runner 68 extending below the frame 11 and secured thereto by any suitable means.

A belt 69 connects the pulley 42 to a pulley 70 secured to the ground wheel 15 so that the wheel 45 and disc 49 are rotated as the planter is drawn over the ground and rotation of the wheel 45 causes rotation of wheel 63. This is accomplished by each divider 47 as it passes opening 62, contacting one of the dividers 66 of wheel 63 extending above the opening to rotate the wheel 63 and discharge the seeds therefrom.

A sheet metal cover 71 is provided for the outer face of disc 49 and is held in place by suitable fastening means to frame 11. The cover 71 is formed with a centrally located outwardly bent portion 72 forming a boss which covers the ends of shaft 41 and is further provided with an annular outwardly bent portion 73 located adjacent the periphery of cover 71. The annular portion 73 lies directly over the recess 53 in disc 49 when the cover is secured in place and forms therewith a hollow area to receive seed from the seed boot 30. The seed is fed by gravity from the hopper 28 through boot 30 which is secured in an opening 74 at the bottom of the annular portion 73. The seed will feed into said area formed by the portion 73 and recess 53 until it reaches the level of opening 74 at which time no further seed will enter into the space between these members.

When a field is to be planted with a given crop, the farmer will choose a disc 49 having a given number of openings therein, the number of openings being selected in accordance with the gearing ratio available from pulleys 42 and 70 and the speed of the tractor. All these factors will be computed in advance and be furnished to the user of the planter. It will be understood that a single disc 49 with a given number of openings will perform the dispensing of a number of different size seeds and will not require the disc 49 to be changed except when seeds of extreme differences in sizes are to be planted. In addition, the ability of the user to change the size of the compartments in wheel 45 along with the other controllable factors set forth above permits the deposition of seed to be controlled completely both as the number of seeds deposited and the spacing of the seed within the furrow.

Once the disc 49 is selected and the seed distributor is positioned on frame 11 with the planter attached to a draft vehicle, the hopper may then be filled with a quantity of seed which will feed by gravity through the boot 30 into the area formed by portion 73 of the cover 71 and the recess 53. The seed will continue to fill this area until the mouth of the boot is reached by the seed level.

As the planter is drawn over the field, the disc 49 will rotate in the direction indicated by the arrows in FIGURES 4, 5, and 7 and each of the openings 52 will successively pass through the supply of seed at which time the gripping portion of fingers 55 will be opened to receive a seed. The opening of the fingers is accomplished by the leg 61 of fingers 55 contacting the front end 37' of the cam surface 37 to raise the legs 57 and 58 of the fingers with respect to the surface 38 of plate 34. When the gripping portion of the finger is in this raised position, a V is formed by the finger 55 and the surface 38 which will receive a seed in the bight thereof as the fingers pass through the seed.

If the seed being planted is somewhat flat in nature such as corn, then the bevel 54 will aid to turn the seeds to assure that the seeds will be presented to the gripping portion of the finger while lying on one of their flat sides. Such positioning of the seeds in conjunction with the roughened under surface of the finger 55 permits the gripping portion to more firmly hold the seed during its travel to the discharge opening 39.

After the leg 61 of the finger 55 passes off end 37" of cam 37, the second engaging means or finger securely holds the seed against the first engaging means or surface of plate 34 and holds the seed in continuous sliding contact initially against the first bearing surface 38 and subsequently against the second bearing surface 40a during the rotation of the disc 49 around to the discharge opening 39. The recessed portion 40 just preceding the discharge opening 39 assures that only a single seed from each finger will be delivered to the opening. Should two seeds be held by the gripping legs 57, 58 of the finger, the outermost seed located in the bight of V will be released as soon as it passes over the front edge of recess 40. This happens because the rearmost seed is still held between legs 57, 58 and surface 38 so that the gripping action of the finger 55 is released with respect to the front seed as soon as recess 40 is encountered and the seed will drop away by gravity before opening 39 is reached and return to seed supply through the annular recess 53.

When finger 55 carrying a seed therewith reaches opening 39, the seed is impelled by the spring action of the finger into the opening to pass into the interior of the housing.

Within the housing, the compartmented wheel is rotating in unison with disc 49 and one of the compartments of the wheel receives the seed as it is discharged into the opening 39. The seed is then carried by the wheel 45 to the opening 62 where it is deposited into one of the compartments of valve wheel 64; and as this wheel is rotated as previously described, the seed or seeds are dropped through the opening 69 in runner 68 into the furrow.

It will be seen that the number of seeds dropped into the furrow at each spacing can be controlled by rearranging dividers 47 to vary the size of the compartments of wheel 45. For instance, if the disc 49 contains eight of the openings 52 and dividers 47 are placed at positions corresponding to the first opening and the fifth opening, then four seeds would be delivered to each spacing along the ground. On the other hand, if four dividers were used with wheel 45 and placed at positions corresponding to the first, third, fifth and seventh openings, two seeds would be delivered to each spacing.

It will be readily understood that the present invention provides a planter which will assure the farmer that the field will be covered without any skipping occurring and be further assured that the correct number of seeds are being planted in the furrow.

Although a specific embodiment of the invention has been shown to illustrate the principles of the invention, it should be clear that many modifications can be effected that do not depart from these principles and therefore this invention should be limited only by the spirit and scope of the following claims.

I claim:

1. A seed planter comprising: a housing having a discharge opening in one of its faces, a cam associated with said face, a disc rotatably mounted on said face and provided with a plurality of openings, means for rotating said disc, movable means mounted in each of the openings in said disc and adapted to be actuated by said cam, a supply of seed through which said openings pass during rotation of said disc, said cam during rotation of the disc causing said movable means to assume an open position when passing through said seed to receive one of the same and then release said means to securely hold the seed during rotation of the disc until said discharge opening is reached.

2. A seed planter comprising: a housing having a discharge opening in one of its faces, a cam associated with said face, a disc rotatably mounted on said face and provided with a plurality of openings, means for rotating said disc, a movable finger mounted in each of said openings and adapted to be actuated by said cam, a supply of seed through which said openings will pass when said disc is rotated, said cam during rotation of said disc causing each of said fingers to move to an open position when passing through the seed to receive one of the same, then release the finger to securely hold the seed during rotation of the disc until said discharge opening is reached.

3. The invention as in claim 2 wherein the outermost edge of each of said openings in said disc is bevelled outwardly from the outer face of the disc to the innerface to aid in positioning said seed for engagement by said finger.

4. The invention as in claim 2 wherein said finger comprises: a gripping portion and an inner portion the end of which is in contact with the inside face of said disc, the remaining part of said inner portion being angularly displaced out of the plane of the gripping portion to act as a spring to bias said gripping portion into a seed gripping position.

5. A seed planter comprising: a hollow housing having in one of its faces a discharge opening into the interior thereof, a compartmented wheel rotatably mounted in the interior of said housing, a cam associated with said face, a disc rotatably mounted on said face and provided with a plurality of openings, means for rotating said disc, a movable finger mounted in each of said openings and adapted to be actuated by said cam, a supply of seed through which said openings will pass when said disc is rotated, said cam during rotation of said disc causing each of said fingers to move to an open position when passing through said seed to receive one of the same, then release the finger to securely hold the seed during further rotation of the disc until the discharge opening is reached where the seed is discharged into one of the compartments of said wheel.

6. The invention as in claim 5 wherein, when the finger is released, the seed is locked between said finger and face of said housing.

7. The invention as in claim 5 wherein said fingers when in open position form a V shaped opening with said face so that only the seed located in the bight of the V will be held when said cam releases the finger.

8. The invention as in claim 5 wherein the size of the compartments in said wheel are adjustable to control the number of seeds each can receive.

9. A seed planter comprising: a hollow housing having in one of its faces a discharge opening into the interior thereof, a compartmented wheel rotatably mounted in the interior of said housing, said wheel provided with movable dividers for changing the size of said compartments, a cam associated with said face, a disc rotatably mounted on said face and provided with a plurality of openings, means for rotating said disc and said wheel in unison, a movable finger mounted in each of said openings and adapted to be actuated by said cam, a supply of seed through which said openings will pass when said disc is rotated, said cam during rotation of said disc causing each of said fingers to move to an open position when passing through said seed to receive one of the same, then release the finger to securely hold the seed during further rotation of the disc until the discharge opening is reached where the seed is discharged into one of the compartments of said wheel and a second compartmented wheel rotatably mounted between the walls of said housing at the bottom thereof, the compartments of which cooperate with the compartments of said first wheel to control the number of seeds delivered to the ground.

10. A seed planter comprising: a hollow housing having in one of its faces a discharge opening into the interior thereof, a cam associated with said face, a disc rotatably mounted on said face and provided with a plurality of openings, means for rotating said disc, a recess in said face, one end of which is connected into one end of said discharge opening, a movable finger mounted in each of said openings in said disc, and adapted to be actuated by said cam, a supply of seed through which said openings pass when said disc is rotated, said cam during rotation of said disc causing each of said fingers to move to an open position when passing through the seed to receive one of the same, then release said finger to securely hold the seed during rotation of the disc, said seed being held in a V-shaped opening formed by the finger and said face, said recess acting to assure that only a single seed reaches said discharge opening by causing any extra seeds held by said finger other than the one located in the bight of said V-shaped opening to be released before said finger reaches the discharge opening.

11. The invention as in claim 10 wherein a compartmented wheel is rotatably mounted in the interior of said housing and which is rotated by the same means as the disc and wherein said seeds are discharged into one of said compartments to be delivered to the ground.

12. A seed planter comprising: a hollow housing having in one of its faces a discharge opening into the interior thereof, said opening positioned at a point substantially above the bottom of said housing when the housing is arranged in a vertical position, a compartmented wheel mounted for rotation within the interior of said housing, a second discharge opening in said housing from its interior to its exterior and located at the bottom thereof, a second compartmented wheel rotatably mounted in said second opening, a cam associated with said face, a disc rotatably mounted on said face and provided with a plurality of openings, means for rotating said disc and said first compartmented wheel in unison, said second wheel driven by said first wheel, a movable finger mounted in each of said openings and adapted to be actuated by said cam, a supply of seed through which said openings will pass when said disc is rotated, said cam during rotation of said disc causing each of said fingers to move to an open position when passing through said seed to receive one of the same, then release the finger to securely hold the seed during further rotation of the disc until the discharge opening is reached where the seed will be discharged into one of the compartments of said first wheel, the compartments of said second wheel cooperating with those of said first wheel to control the number of seeds delivered to the ground.

13. A seed planter comprising: a hollow housing having on one of its faces a discharge opening into the interior thereof, said face having a flat outer portion and an inner recessed portion, a cam associated with said face and located in said recessed portion, a disc rotatably mounted on said face and provided with a plurality of openings, means for rotating said disc, said disc having on its inner side a flat outer portion to cooperate with said flat outer portion of said face and an inner recessed portion cooperating with said first mentioned recessed portion of said face, a movable finger mounted in each of said openings of said disc and adapted to be actuated by said cam, a cover for said disc which forms therewith a chamber to hold a supply of seed through which said openings pass when said disc is rotated, said cam during rotation of said disc causing said fingers to move to an open position when passing through said seed to receive one of the same, then release said fingers to securely hold the seed during rotation of the disc until the discharge opening is reached.

14. The invention as in claim 13 wherein a compartmented wheel is rotatably mounted in the interior of said housing and which is rotated by the same means as said disc and wherein said seeds are discharged into one of said compartments to be delivered to the ground.

15. The invention as in claim 13 wherein said flat outer portion of said face is recessed in the area immediately adjacent the leading edge of said discharge opening to provide a means for assuring that each of said fingers delivers only a single seed to the discharge opening.

16. A seed planter comprising: a hollow housing having in one of its faces a discharge opening into the interior thereof positioned at a point substantially above the bottom of said housing when the housing is arranged in a vertical position, a hopper mounted above said housing and containing a quantity of seed, said face having a flat outer portion and an inner recessed portion, a cam associated with said face and located in said recessed portion, a disc rotatably mounted on said face and provided with a plurality of openings, means for rotating said disc, said disc having on its inner side a flat outer portion to cooperate with said flat outer portion of said face and an inner recessed portion cooperating with said first mentioned recessed portion of said face, a movable finger mounted in each of said openings of said disc and adapted to be actuated by said cam, a cover for said disc which forms therewith a chamber to hold a supply of seed through which said openings pass when said disc is rotated, a seed boot connecting said hopper to said cover at the lower portion thereof to provide a means for seed to be fed by gravity from said hopper to said chamber, a first wheel with adjustable compartments mounted in the interior of said housing and adapted to be rotated in unison with said disc, a second discharge opening at the bottom of said housing when arranged in vertical position and a second compartmented wheel rotatably mounted in said last mentioned opening, said second wheel being driven by said first wheel, said fingers being actuated to an open position by said cam as they pass through the seed in said chamber to receive one of the same, said fingers when released by the cam securely holding the seed during rotation of the disc until the first mentioned discharge opening is reached where said seed is deposited in one of the compartments of said first mentioned wheel, the second compartmented wheel cooperating with said first wheel to control the number of seeds delivered to the ground.

17. The invention as in claim 16 wherein the dividers defining the compartments of the first wheel cooperate with the dividers defining the compartments of the second wheel to cause rotation of said second wheel.

18. A seed planter comprising: a housing having a discharge opening in one of its faces, a cam associated with said face, rotatable means mounted on said face, means for rotating said rotatable means, movable means mounted on said rotatable means and adapted to be actuated by said cam, a supply of seed through which said movable means pass during rotation of said rotatable means, said cam during rotation of the disc causing said movable means to assume an open position when passing through said seed to receive one of the same and then release said means to securely hold the seed during rotation of the rotatable means until said discharge opening is reached.

19. The seed planter set forth in claim 18 wherein a compartmented wheel is rotatably mounted in the interior of said housing and which is rotated by the same means as the rotatable means and wherein said seeds are discharged into one of said compartments to be delivered to the ground.

20. A seed planter comprising: a supply of seeds (S), conveying means (45, 62, 63, 67) to convey selected seeds to a seedbed, and seed selecting means including a surface (38) disposed between the supply of seeds and the conveying means, said surface having a portion in contact with said supply of seeds and another portion provided with a discharge opening (39) that is in communication with said conveying means, and seed engaging means (55) normally biased toward said surface and operable to engage seed within said supply of seeds, to hold said seed in continuous sliding contact against the surface, and to forcibly eject the engaged seed through said discharge opening.

21. The seed planter set forth in claim 20 in which the surface is provided with a relatively small step (40b), the engaged seed being slid over said step by said engaging means whereby extra seeds held between said engaging means and the surface are caused to be released before said engaging means reaches the discharge opening.

22. The seed planter set forth in claim 20 in which said conveying means convey seeds to said seedbed at a rate responsive to movement of said seed engaging means.

23. A seed planter comprising: a supply of seeds (S), conveying means (45, 62, 63, 67) to convey selected seeds to a seedbed, and seed selecting means including a surface (38) having a first portion in contact with said supply of seeds and a second portion remote from the supply of seeds, said second portion being provided with a discharge opening (39) in communication with said conveying means and through which individual seeds may be selectively discharged, rotary means (49) operatively associated with said surface, a plurality of engaging means (55) carried by said rotary means and normally resiliently biased toward said surface, means (70, 69, 42, 41) to rotate said rotary means, and means (37) to hold said engaging means away from the first portion of the surface whereby seed can be introduced between said first portion and said engaging means, said engaging means engaging seed as they pass through said supply of seed, holding the engaged seed in continuous sliding contact with said surface, and forcibly ejecting said engaged seed through said discharge opening.

24. The invention set forth in claim 23 in which step means are provided on said surface to insure that only a single seed be discharged by each engaging means, the engaged seed being slid over said step means by said engaging means, the parts being so arranged and constructed that if more than one seed is initially held in contact with said surface by said engaging means that as the step is encountered the outermost seed will be released while the rearmost seed will be held in contact with said surface.

25. The seed planter set forth in claim 23 in which a compartmented wheel (45) is rotatably mounted adjacent said discharge opening and which is rotated by the same means as the rotating means and wherein said seeds are discharged into one of said compartments.

References Cited by the Examiner

UNITED STATES PATENTS

| | | | |
|---|---|---|---|
| 886,253 | 4/1908 | Roseland | 221—217 |
| 1,566,187 | 12/1925 | Fifer | 222—370 X |
| 2,613,850 | 10/1952 | Varco | 221—217 |

ABRAHAM G. STONE, *Primary Examiner.*

WILLIAM A. SMITH III, *Examiner.*

UNITED STATES PATENT OFFICE
CERTIFICATE OF CORRECTION

Patent No. 3,308,774                      March 14, 1967

Eugene G. Keeton

It is hereby certified that error appears in the above numbered patent requiring correction and that the said Letters Patent should read as corrected below.

In the heading to the printed specification, lines 3 and 4, for "Eugene G. Keeton, Trenton, Ky., assignor to Deere & Company, Moline, Ill., a corporation of Delaware" read -- Eugen G. Keeton, Trenton, Ky. --.

Signed and sealed this 7th day of November 1967.

(SEAL)
Attest:

Edward M. Fletcher, Jr.                      EDWARD J. BRENNER

Attesting Officer                            Commissioner of Patents

UNITED STATES PATENT OFFICE
CERTIFICATE OF CORRECTION

Patent No. 3,308,774                      March 14, 1967

Eugene G. Keeton

It is certified that error appears in the above identified patent and that said Letters Patent are hereby corrected as shown below:

Column 9, line 32, for "disc" read -- rotatable means --.

Signed and sealed this 22nd day of July 1969.

(SEAL)
Attest:

Edward M. Fletcher, Jr.                  WILLIAM E. SCHUYLER, JR.
Attesting Officer                          Commissioner of Patents